C. P. SPECK.
METHOD OF MAKING CONFECTIONS.
APPLICATION FILED MAY 17, 1920.

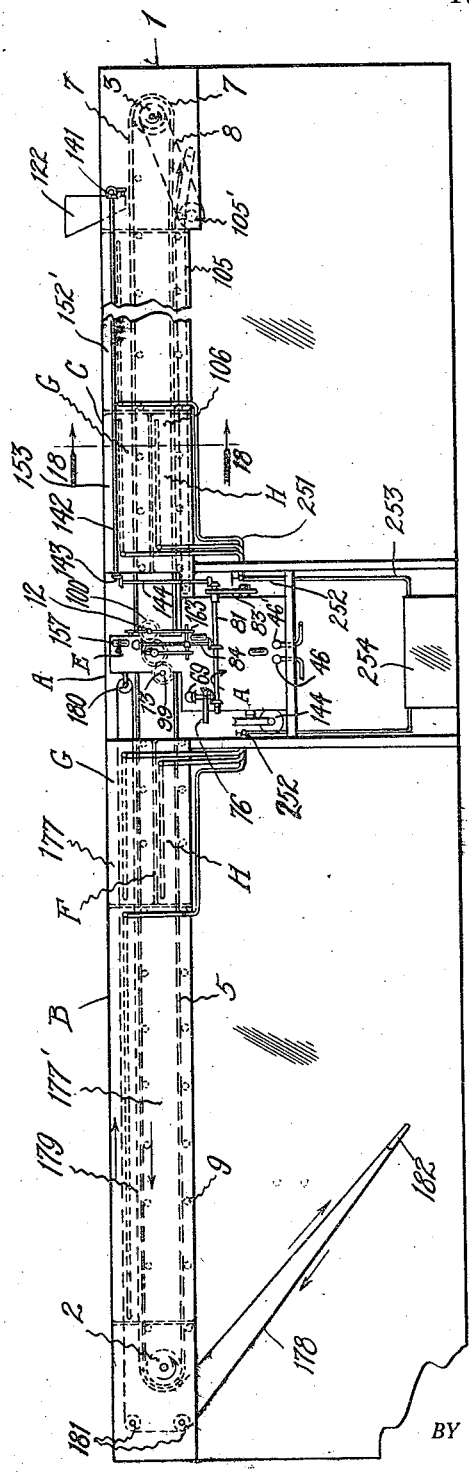

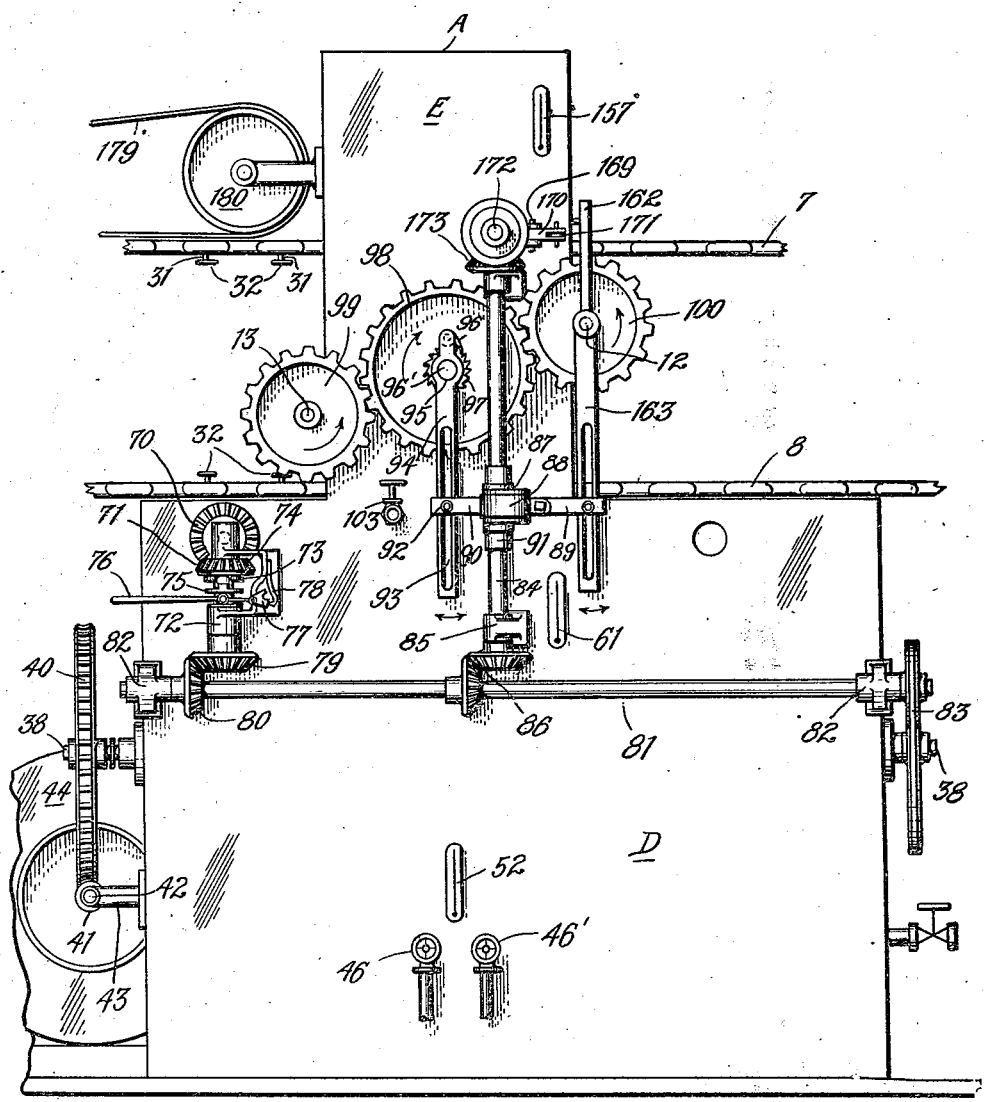

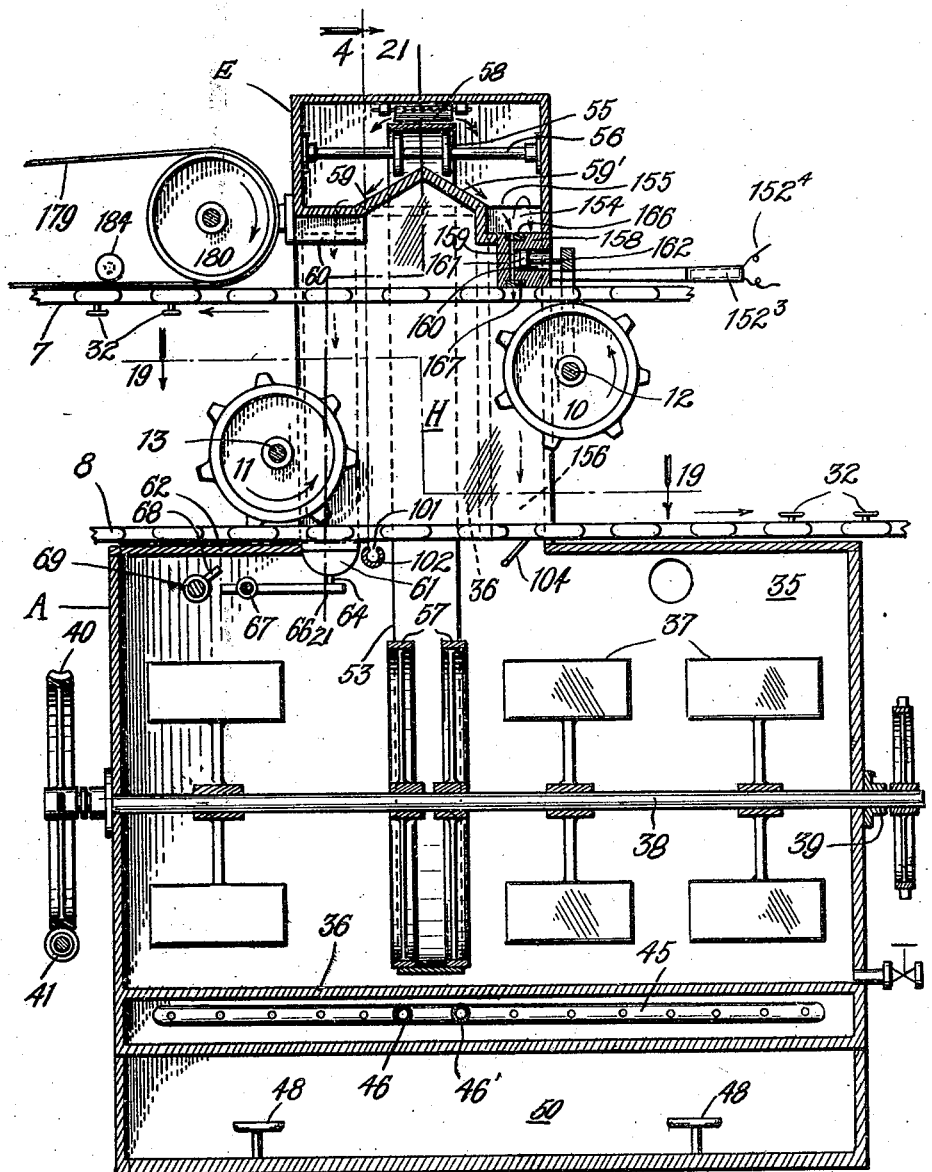

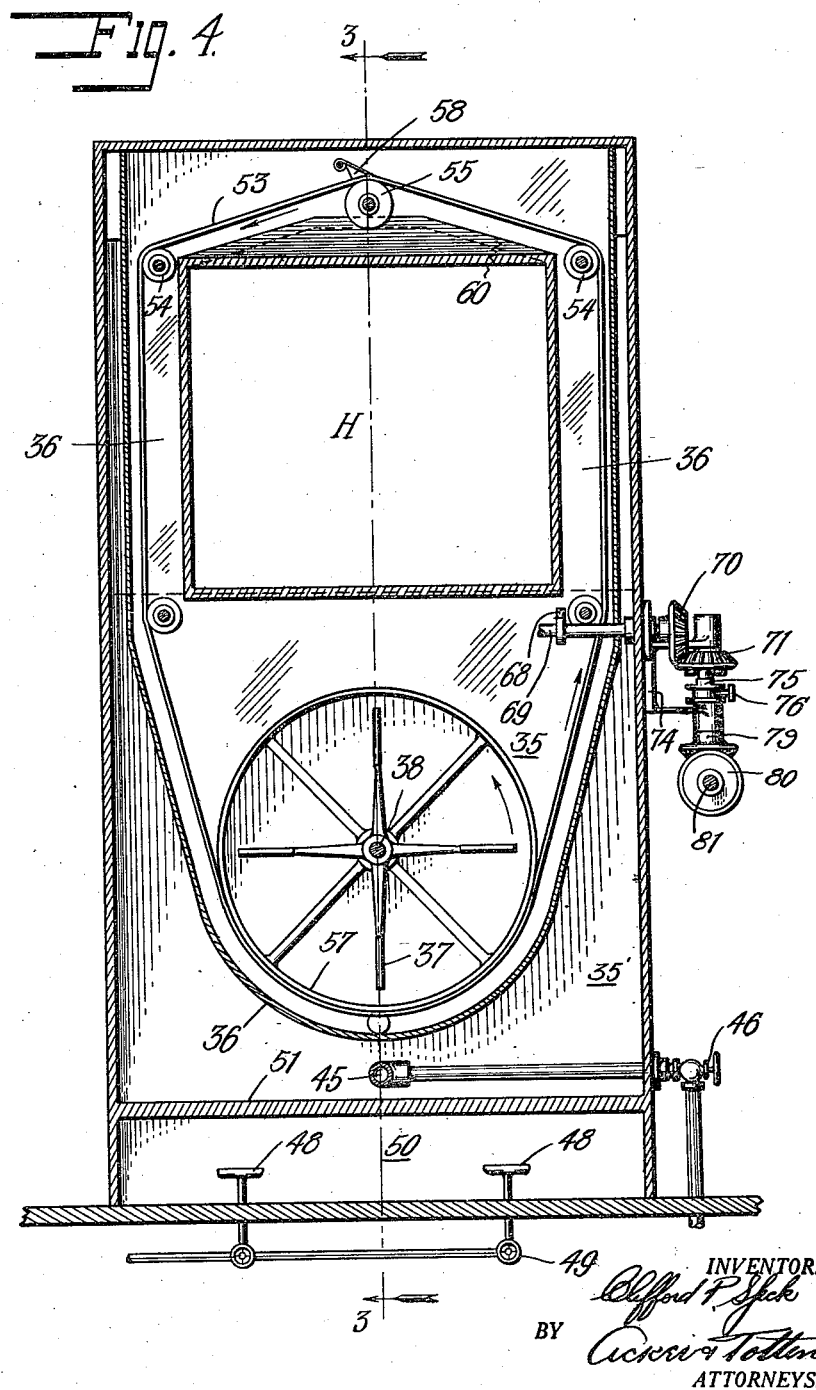

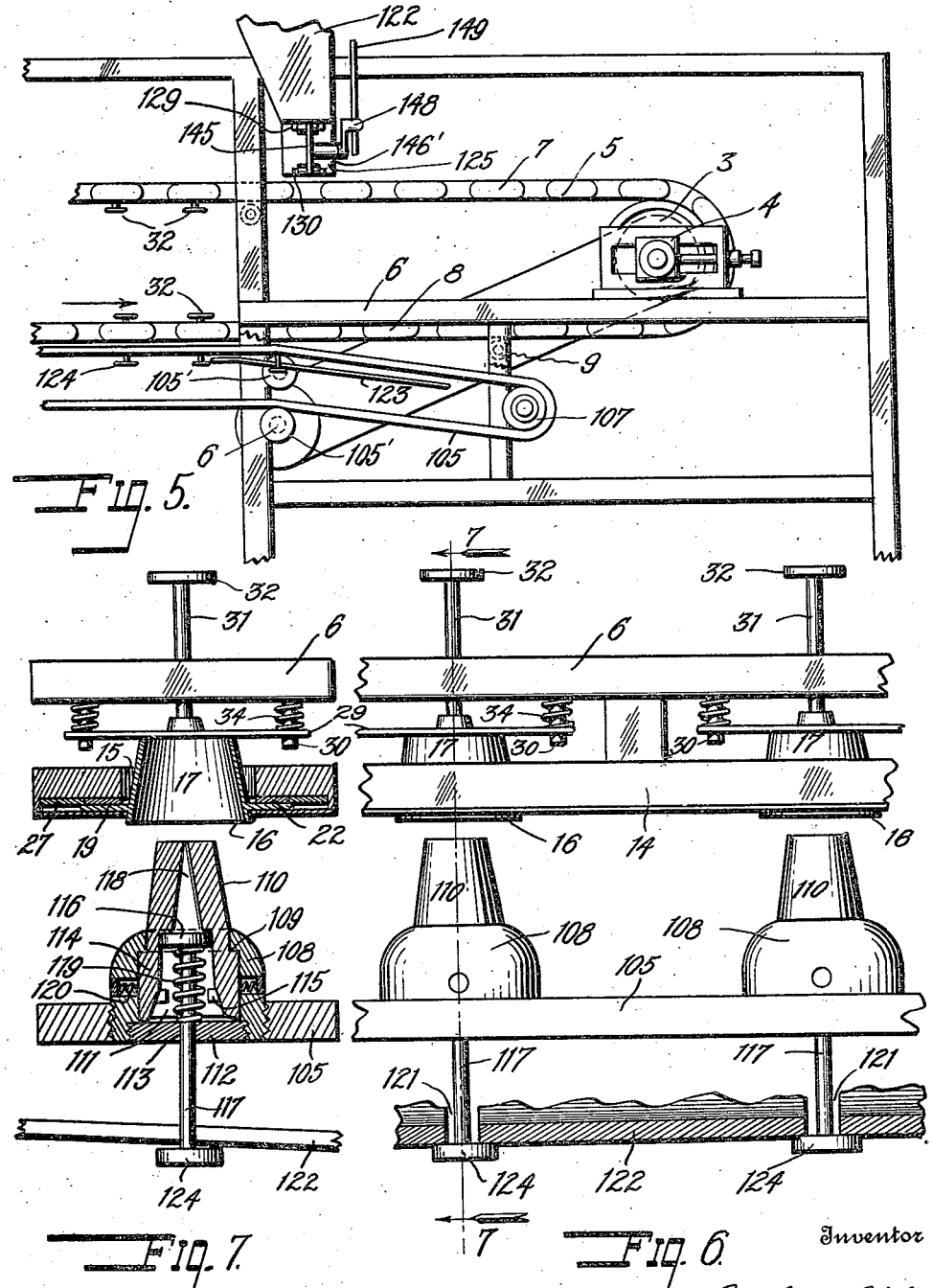

1,421,600.

Patented July 4, 1922.
10 SHEETS—SHEET 6.

Inventor
Clifford P. Speck
By Acker & Totten
Attorney

C. P. SPECK.
METHOD OF MAKING CONFECTIONS.
APPLICATION FILED MAY 17, 1920.
1,421,600.
Patented July 4, 1922.
10 SHEETS—SHEET 7.
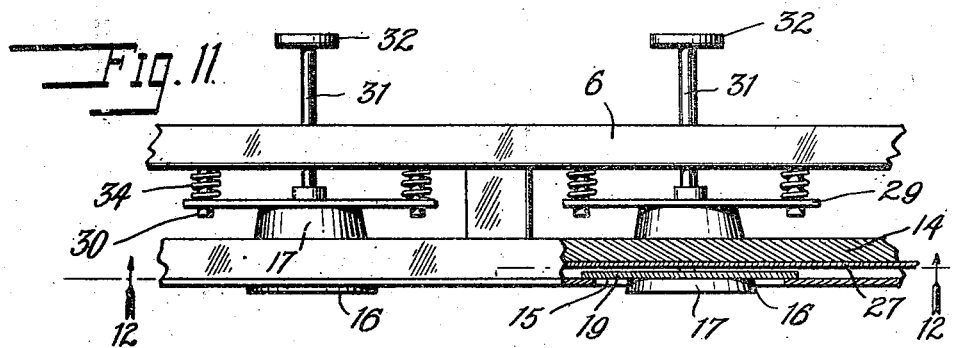
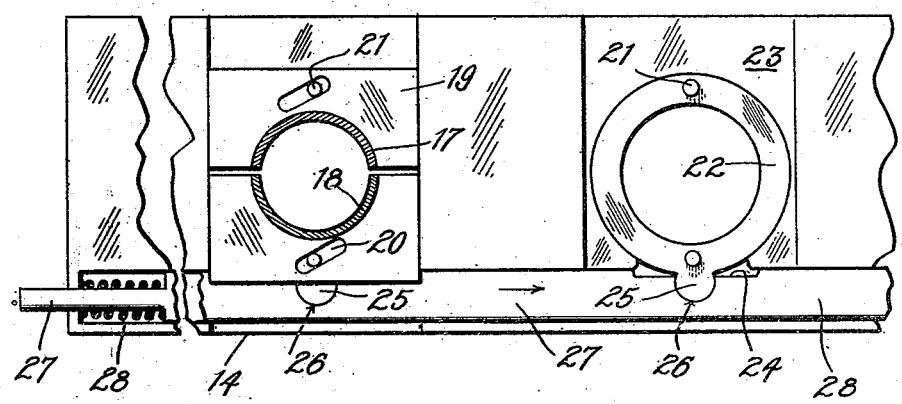
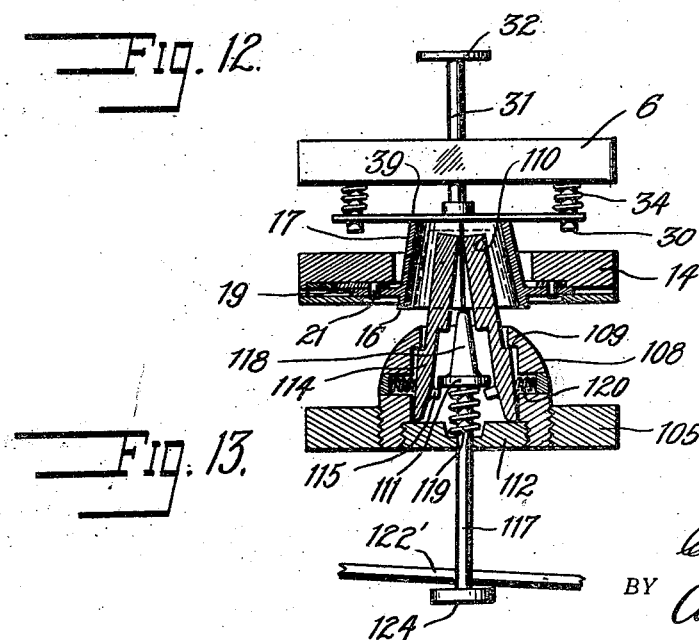
INVENTOR.
Clifford P. Speck
BY Acker & Totten
ATTORNEYS.

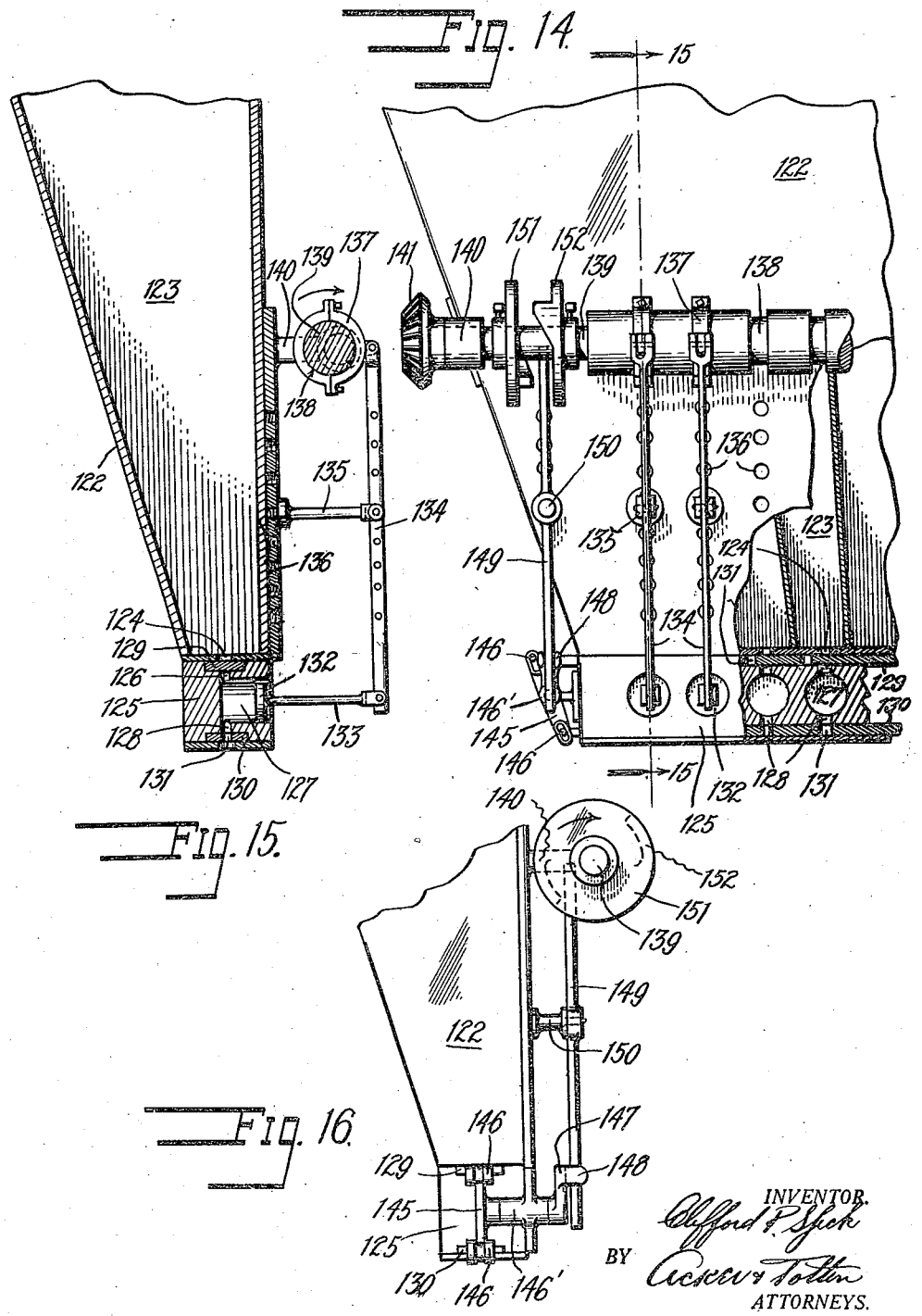

C. P. SPECK.
METHOD OF MAKING CONFECTIONS.
APPLICATION FILED MAY 17, 1920.
1,421,600.
Patented July 4, 1922.
10 SHEETS—SHEET 9.
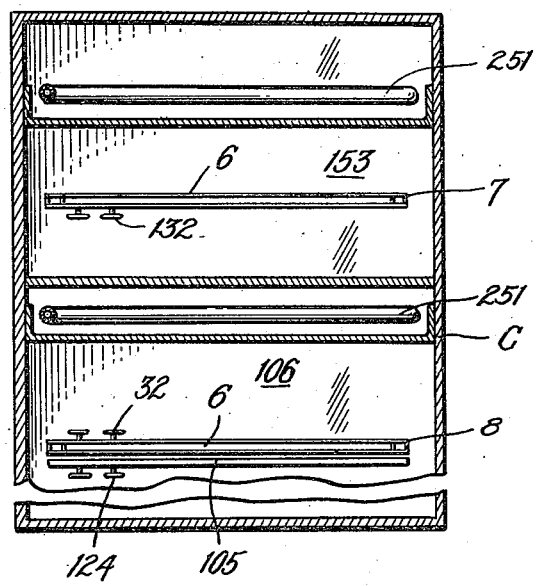
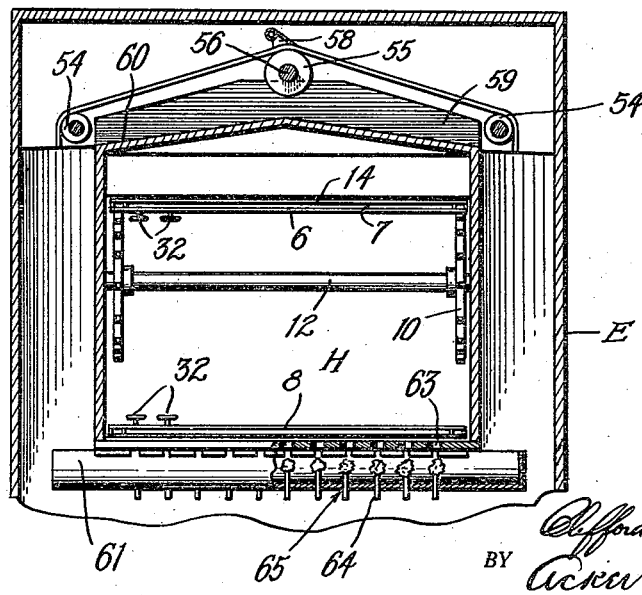
INVENTOR.
Clifford P. Speck
BY
Acker & Totten
ATTORNEYS.

C. P. SPECK.
METHOD OF MAKING CONFECTIONS.
APPLICATION FILED MAY 17, 1920.

1,421,600.

Patented July 4, 1922.
10 SHEETS—SHEET 10.

INVENTOR
Clifford P. Speck
BY
Cicker & Totten
ATTORNEYS.

UNITED STATES PATENT OFFICE.

CLIFFORD P. SPECK, OF OAKLAND, CALIFORNIA.

METHOD OF MAKING CONFECTIONS.

1,421,600. Specification of Letters Patent. Patented July 4, 1922.

Application filed May 17, 1920. Serial No. 381,848.

*To all whom it may concern:*

Be it known that I, CLIFFORD P. SPECK, a citizen of the United States, residing at Oakland, in the county of Alameda and State of California, have invented certain new and useful Improvements in Methods of Making Confections, of which the following is a specification.

In the making of candy by the methods now employed, particularly in the manufacture of what is commonly termed chocolate covered, or cream covered, or cast in starch goods, it is customary to first make in starch filled trays, forms or impressions therein and fill these impressions with the material to be used as the center for the finished product. It is necessary before using this center to let the same set, to enable the starch form to be broken therefrom, after which time the starch used is retreated and used in subsequent forms. The formed center thus made is afterwards coated by one of several different processes, the most common being what is known as the dipping process, wherein operators, through hand movement, or by machine, apply a coating to the exterior of the center.

The present invention relates to a method in which the investment in material, equipment and operators required by the methods now employed may be materially reduced if not entirely eliminated, and whereby confections are capable of being manufactured in a continuous manner without the requirement of starch, starch trays, dipping tables, hot rooms, starch bucks, printer-machines, hand dipping or dipping machines, or decorating machines, and without the necessity of delaying the completion of the goods while the centers dry or set.

The principal object of the present invention is to provide a method wherein the shell, more commonly known as the outside coatings, are formed in a predetermined size, shape and thickness, in a suitable mold, and containing a chamber or recess for receiving the center or filler, one wherein the molds, both before receiving the coating and with the coating therein, are maintained under the required temperature to obtain the best results in the finished product.

The present improved method eliminates the unsanitary handling of the confections by the various dippers and other operators during the manufacturing of the confection, and enables solid filled or any form of confection now made to be manufactured in a sanitary manner by any suitable mechanism without being worked in starch or coated by the dipping process or by methods now in use.

In carrying out my method, I reverse the method of manufacture now universally in use and first form in permanent sanitary molds a suitable shell for subsequent filling and closing either immediately after its formation or at a subsequent time, and if filled immediately after its formation, supplying the formed shell preferably while the same is in the mold with the desired quality and quantity of filler prior to closing the same with a like material as forms the shell.

The present invention consists primarily in providing a continuous method wherein suitable molds for the formation of the confections are employed, and which are supplied with confection forming material at the required temperature and consistency from a receptacle containing a larger quantity of material maintained therein under correct conditions to produce the most efficient results in the finished product, and distributing the confection forming material supplied to the molds over the wall surface thereof to form a cup like shell having an opening.

The method further consists in the making or molding of either solid or filled goods by the employment of molds and wherein either a shell for subsequent filling, in the case of filled goods, or a complete molded confection is formed therein of the same material in the case of hard goods, without the requirement or necessity of the same being touched or handled by operators during the operation.

By my present method I maintain the mold and material supplied thereto in the process of forming the confection at the required temperature to obtain the best results, by subjecting the mold and its associated confection formed thereby to the action of cooling mediums so that the same may, if desired, be packed for shipment immediately after molding.

It will be understood that any suitable mechanism for carrying out the various steps of the present method may be employed, and for the purposes of illustration and description the mechanism set forth in the drawings accompanying this application and forming a part thereof constitutes one form of mechanism in carrying out the method and wherein Figure 1 is a view in front elevation of one embodiment of an apparatus for carrying out my method, Figure 2 is a view in front elevation of the upper portion of the coating containing chamber, illustrating the various drive mechanisms carried thereby.

Figure 3 is a sectional view through the apparatus illustrated in the center of Figure 1 and also in Figure 2, taken on line 3—3 of Figure 4 disclosing the coating container, the coating elevator, mixers and temperature maintaining apparatus.

Figure 4 is a vertical sectional view taken on line 4—4 of Figure 3 and disclosing more fully the temperature controlling means, the coating elevator.

Figure 5 is an enlarged view in detail of one end of the apparatus at a point where the fonda is supplied to the lined molds.

Figure 6 is a view in detail of a pair of molds with their associated plungers, taken on line 6—6 of Figure 5.

Figure 7 is a vertical sectional view taken through one of the pairs of molds on 7—7 of Figure 6.

Figure 11 is a view in broken side elevation of one of the conveyer bars, illustrating a pair of molds therein and the mold section operating means for one set of molds.

Figure 12 is a longitudinal sectional view of the broken bar illustrated in Figure 11, taken on line 12—12 of Figure 11.

Figure 13 is a view in vertical section of one of the molds and its associated content forming core received therein and in collapsed position.

Figure 14 is an enlarged view in front elevation partly in section of the fonda reservoir illustrated in Figures 1 and 5.

Figure 15 is a vertical sectional view taken on line 19—19 of Figure 14.

Figure 16 is a view in end elevation of the construction illustrated in Figure 14.

Figure 17 is a vertical sectional view taken on line 21—21 of Figure 3 of the drawings.

Figure 18 is a section taken on line 18—18 Figure 1.

The numeral 1 indicates a housing for the apparatus consisting of the main central section A and laterally disposed wing sections B and C tubular in form and preferably rectangular in cross section. The central section A consists of a base D and a reduced portion E, Figure 2 of the drawings, and said wing sections B and C are disposed preferably in line, and at opposite sides of this reduced upper portion E of the central section A. The inner ends of the sections B and C adjacent the reduced portion E of the central section A are each divided by a horizontal partition F into upper and lower cooling chambers G and H illustrated in Figure 1 of the drawings.

Figure 8:
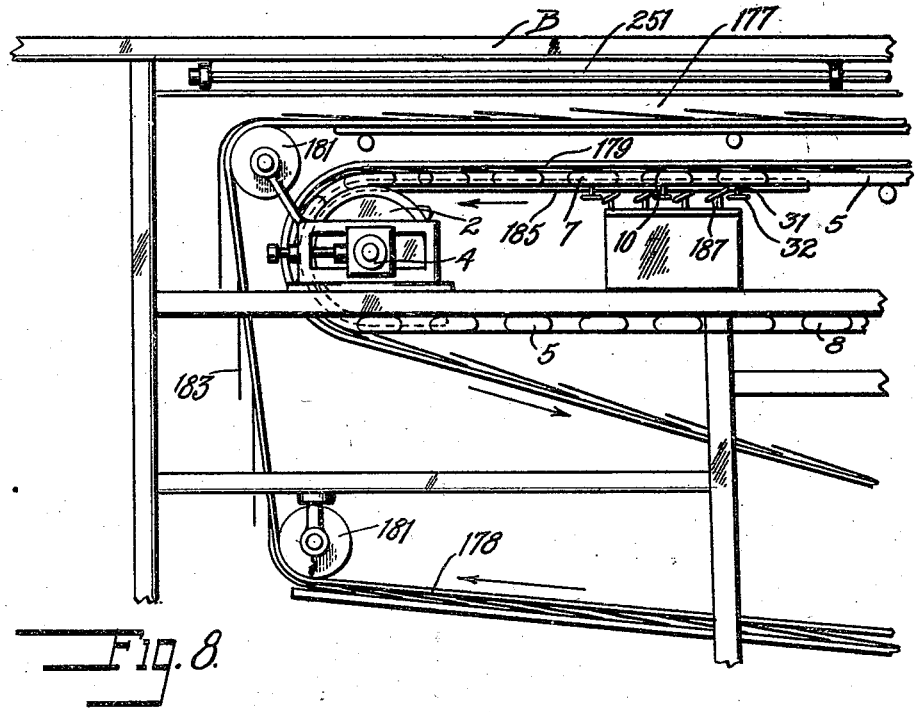
Figure 8 is an enlarged view in detail of the opposite end of the apparatus from that illustrated in Figure 5, illustrating more particularly the conveyer on which the finished confections are deposited from the molds.
Figures 9, 10:
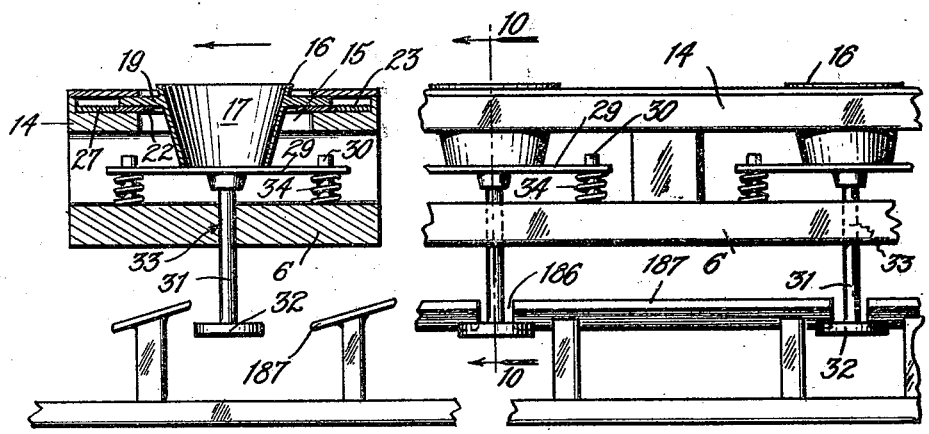
Figure 9 is a view in elevation of the molds in their inverted position, and illustrating the operating means for the mold content discharge plungers.
Figure 10 is a vertical sectional view of one of the molds illustrated in Figure 9, taken on line 10—10 of Figure 9.
Figure 20:
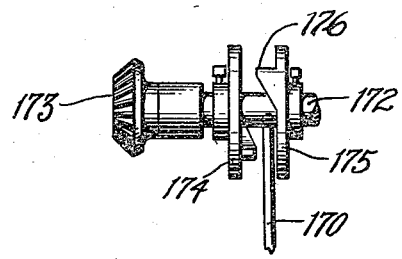
Figure 20 is a view in detail of the drive mechanism for feeding the shell closing material to the shells.

The confection or candy is molded in several stages and the molds are preferably constructed to operate in the following manner. Rotatably mounted adjacent the extreme ends of the wings B and C are suitable sprocket wheels 2 and 3, Figures 1, 5 and 8 of the drawings, carried in adjustable bearings 4, and around said sprockets pass the endless conveyer side chains 5 of any well known link type. The conveyer chains are connected at intervals throughout their length by the transversely extending parallel spaced mold support bars 6, Figures 6, 7, of the drawings; thus the chains 5 and bars 6 form a complete conveyer supported at opposite ends by the sprockets 2 and 3 which divide the conveyer into upper and lower flights 7 and 8. The upper flight 7 passing through the upper cooling chambers in the wings B and C, and the lower flight passing through the lower cooling chambers in the wings B and C, as in Figure 1 of the drawings. At the point of the passing of the conveyer flights 7 and 8 transversely through the reduced upper portion E of the main central section A, said section is provided with a suitable chamber or passage H extending transversely therethrough in line with the adjacent ends of the tubular wings B and C, as in Figures 1, 3 and 21 of the drawings. The flights 7 and 8 intermediate the sprockets 2 and 3 are supported and prevented from sagging by suitable slides or idler or supporting rolls 9 and said conveyer flights are operated in the direction of the arrows, Figures 1, 3, 5 and 8 of the drawings, by the sprocket wheels 10 and 11 associated with the reduced portion E of the central section A. The sprockets 10 being carried by the shaft 12 and engaging with the chain links of the upper flight 7 and the sprockets 11 being supported on the rotatable shaft 13 and engaging with the lower flight 8, and said sprockets are intermittently rotated to impart a step motion to the conveyer by a hereinafter described mechanism.

Extending parallel with the outer face of each bar 6 is a suitable mold support 14 formed at spaced intervals throughout its length with suitable mold receiving apertures 15, and on each of said apertures is positioned a mold, the preferred form thereof being illustrated in Figures 6, 7, 10, and 11 of the drawings. The molds each consist preferably of the conical open ended cups 16 divided vertically preferably into the two halves 17 and 18, and from each half section adjacent the peripheral edge of the cup extends a laterally disposed supporting plate 19, Figures 7, 11 and 12 of the drawings, and each of said plates is provided with a diagonal slot 20, and into each of which extends a pin 21 carried by a suitable mold section opening and closing ring 22. The inner opening of the ring 22 is of a diameter slightly larger than the exterior diameter of the cup 16 adjacent the inner face of the flange 19, and said ring is received in a depression in the member 14 surrounding the opening 15, and in said depression is a plate 23 having a circular opening within which the ring is axially rotatable. The plate 23 is formed with an opening 24 at one side, through which projects a tongue 25 extending laterally from one face of the ring 22. The tongues 25 associated with the respective rings 22 of the molds of any given bar are received in depressions or notches 26 in a common mold actuating bar 27 disposed longitudinally of the member 14, as in Figures 7, 11 and 12 of the drawings. The mold actuating bar 27 of the preferred form of mold extends a short distance beyond one end of the member 14 for contacting at a certain point of the travel of the molds within the lateral wing B, with a mold release bar 185, Figure 8 of the drawings. The movement of the member 27 in the direction of the arrow. Figure 12 of the drawings, on the contact of the end of the member with the release bar 27 imparts a slight rotative movement to all the rings 22 associated with the molds of any given support 14, causing the pins 21 to move within the slots 20 and separate the sections 17 and 18 forming the respective cups or molds 16.

On the release of pressure on the end of the member 27, the coiled spring 28 associated with the members 27 move the same in a direction reverse to the arrow Figure 12 of the drawings, forcing the mold sections 17 and 18 together, as in Figure 12 of the drawings. To close the inner open end of each cup or mold 16, I prefer to position a closure plate 29 adjacent the inner open end of each mold or cup between the members 6 and 14, Figures 6, 7, 9, 10 and 11 of the drawings. The closure plates 29 are disposed in a horizontal plane, and are rectangularly movable to and from the inner end of the cup 16 on guide pins 30 extending inwardly from the bar 6. From the center of each closure plate 29 extends rearwardly an operating stem 31, having an enlarged head 32, the same reciprocating through a guide opening 33 in the bar 6. Each plate 29 is normally maintained in contact with the inner open end of its associated cup 16 by the coiled springs 34 coiled about the respective guide pins 30.

It will thus be apparent that by forming the cup 16 in a number of separable sections and providing means whereby all the sections of the cups or any given bar may be simultaneously separated, the confection formed in the respective cups of any given bar are capable of being simultaneously discharged from their associated cups, and by providing the closure plate for the inner ends of the respective cups any suitable ornamentation may be provided for the upper side or top portion of the confection, but at the same time the operation of the plates in a hereinafter described manner will assist in jarring the confection loose from the mold when it is to desired.

By my present method, I first form in the molds or cups 16 when making filled confection, the outer shell which is preferably of chocolate, and this is supplied to the mold when the mold is in a position with the enlarged open end thereof downwardly disposed, as in Figures 6, 7 and 13 of the drawings, the molds then being associated with the lower flight 8 of the conveyer at a point adjacent the reduced portion E of the main section A. The chocolate or mold forming material is supplied to the molds by the following mechanism:— The base or enlarged portion D of the central section A is provided with a containing chamber 35, Figure 3 of the drawings, the chamber having a rounded lower end 36 and extending the full length of the base D, Figure 3 of the drawings. The upper portion of the chamber 35 which contains the shell forming material, chocolate or coating communicate with the upper reduced portion E of the section A through vertical channels 36 located one at each side of the transverse passage H extending through the reduced portion E, as in Figures 4 and 19 of the drawings. Shell forming material or chocolate coating is supplied to the container 35 in any suitable manner and is preferably maintained therein to a level approximately two-thirds of the depth of the chamber 35, and the same is maintained under agitation to insure uniform consistency by suitable agitating blades or paddles 37 carried on a rotatable shaft 38 extending laterally through the base D and rotatable in bearings 39. The shaft 38 at one end carries a worm gear 40 driven by a worm pinion 41 mounted on a drive shaft 42 rotatable in bearings 43 at one end of the base D and said shaft is operated by power delivered directly thereto from a motor 44. At the base of the chamber 35 within the base D is extended a suitable water jacket 35′ in which is positioned a perforated steam and water receiving pipe supplied with either steam or water through the injection valve controlled supply pipes 46 and 46′ employed for controlling the temperature of the water within the jacket which in turn regulates the temperature of the material or chocolate mass contained within the chamber 35, the excess steam and water raising upwardly around the outer walls of the chamber 35 and escaping or overflowing through ducts 47 disposed vertically in portions of the front and rear walls of the reduced portions E of the section A Figures 4 and 19 of the drawings. From the ducts 47 extend suitable outlet pipes, not illustrated, for conveying the outflow water to any suitable place.

At the extreme lower end of the base D are provided suitable heating elements 48 preferably in the form of burners which are preferably independently controlled by valves 49 and said heating elements are adapted to maintain a temperature of the water in the jacket 35′ immediately above the dividing wall 51 separating the chamber 50 from the water jacket 35′ into which the pipes 45, 46 and 46′ extend. To ascertain the temperature of the water within the water jacket 35′, I provide a suitable thermometer 52, Figure 2 of the drawings. The upper wall forming the chamber H, Figures 3, 4 and 17 of the drawings, is of substantially pyramidical formation and transversely across said upper wall extends a coating elevator belt 53, passing around rolls 54 at the upper and lower ends of the channels 36 and over suitable supporting rolls 55, at the peak of the upper wall of the chamber H, which rolls are supported on rotatable shaft 56, Figures 3, 4 and 17 of the drawings. The belt 53 is driven by and passes around a suitable operating wheel drum 57 carried by the shaft 38, the periphery of which extends in close proximity to the lower end 36 of the container 35. The operation of the belt 53 in the direction of the arrow Figure 4 will, as it passes through the mass of chocolate or shell forming material in the chamber 35 pick up and elevate the chocolate or shell forming material adhering thereto and carry the same to a point adjacent the peak of the upper wall of the member H where it is scraped therefrom by a suitable pivoted scraper 58 contacting with the outer surface of the belt 53, as in Figures 3 and 4 of the drawings. The material thus removed from the belt drops by gravity over the lateral directing walls 59 and 59′ of the wall of the member H and over the wall 59 passes downwardly toward the front and rear of the reduced portion E on the inclined walls 60 dropping downwardly from the terminal ends thereof through chamber 60′ into the ends of a suitable open top trough 61 extending transversely of the upper portion of the chamber 35 adjacent one side wall of the reduced portion E at its base. The temperature of the material contained within the trough 61 may be readily ascertained by the thermometer 61′ carried on the face of the apparatus, as in Figure 2 of the drawings.

From the trough 61, the material or chocolate forming the shell of the confection is fed into the molds as the same are moved into register therewith in the following manner:—

The trough 61, Figures 3 and 17 of the drawings, extends transversely of the side of the top wall 62 of the chamber 35 and which top wall is provided with a transverse row of perforations 63 one in line with each of the cups or molds 16, as the cups or molds are moved into register therewith.

To introduce into the respective molds shell forming material in a plastic flowing condition and in a charge less than the capacity of the molds and from which the shells are formed, I employ within the trough 61 a plunger 64 associated with each perforation 63, said plungers being mounted to reciprocate within suitable guide openings 65, and at their lower ends are engaged with the free end of a suitable operating frame 66 pivoted to a support 67, and the rear short end of the frame is adapted to contact with an actuating lug 68 rotatable in the direction of the arrow Figure 3 of the drawings, with a shaft 69. This shaft extends transversely within the chamber 35 and carries on its outer end a gear 70 with which intermeshes a shaft driving gear 71 loosely mounted on a contershaft 72, and carries on its end surface clutch dogs 73. The countershaft is rotatable within suitable bearings on the clutch frame 74, and has keyed to rotate therewith a dog clutch 75 which is movable longitudinally thereof into and out of engagement with the dog 73 of the gear 71, the clutch being operated by a suitable lever 76, which carries a notched plate 77 engageable by a retaining spring 78 which is adapted to hold the clutch members in driving engagement. The lower end of the shaft 72 carries a gear 79 intermeshing with the corresponding gear 80 on a rotatable shaft 81 mounted in bearings 82 exterially and transversely of the front of the chamber D, said shaft 81 being driven through a chain connection 83 from the shaft 38. The rotation of the shaft 69 in the direction of the arrow, Figure 3 of the drawings, by the above described mechanism reciprocates the plungers 64 within the perforations 63 elevating a charge of material from the trough 61 and depositing said charge of material from the trough 61 and depositing said charge within one of the molds in register with each of the perforations 63, thus the initial charge for forming the coating or shell of the confection is supplied to the respective molds when the molds are positioned with their open ends downwardly disposed. This charge of material less than the capacity of the respective molds being in a state of plasticity approaching a flowing condition, flows by gravity and capillary attraction downwardly over the mold surfaces, gradually cooling and forming within the mold a rough shell. During this operation, the conveyer is at a point of rest and immediately succeeding the operation the conveyer is operated by a step movement to advance the charged molds through the apparatus by the following mechanism :—A countershaft 84 is disposed upwardly at right angles from the shaft 81 and the same is rotatable in bearings 85, it having gear connection as at 86 at its lower end with the shaft 81. The shaft 84 carries a cam 87 surrounding which is a cam ring 88 laterally from which extend arms 89 and 90, the cam being adjustable longitudinally of its shaft 84 between collars 91, and is held to rotate with said shaft 84. The arm 90 carries a pin 92 receivable within a slot 93 of an oscillating lever 94 fulcrumed on its upper end to swing about a shaft 95, and said lever 94 carries a pivoted pawl 96 for engaging a ratchet 96' on the hub of a suitable gear 98 rotatable about the shaft 95. The gear 98 has driving connection at opposite points on its periphery with driving gear wheels 99 and 100 mounted on the end of the respective shafts 13 and 12. The oscillation of the lever 94 imparts intermittent rotary movement to the gear 98, which in turn transmits an intermittent rotary movement to the gears 99 and 100 driving the same in the direction of their respective arrows, Figure 2 of the drawings, which in turn impart rotary movement to the sprockets 10 and 11 in the direction of the arrows, Figure 3 of the drawings, moving the conveyer by a stepped motion in the direction of its arrows, Figure 3 of the drawings.

The charged molds moving with the lower flight of the conveyer in the direction of the arrow, Figure 3 of the drawings, from in register with the perforations 63 are brought into register with suitable perforations 101 on the upper surface of an air blast pipe 102 extended transversely in parallel relation adjacent to the trough 61. Air is supplied to the pipe 102 from any suitable source through a valve connection 103, and on discharging from the perforations 101 directly and upwardly into the charged molds completes the distribution of the chocolate or shell forming material charge within their respective molds uniformly over the inner surface of each mold leaving a non-compressed shell having a smooth inner surface within each mold, and discharges the surplus material. The movement of the conveyer thence carries the molds with the thin evenly distributed chocolate coating or shell forming material therein from the pipe 102 over suitable scraper blades 104 which remove any excess material projecting beyond the edge of the respective molds, which drops by gravity into the chamber 35.

To insure uniformity in the thickness of the walls of the material thus deposited and formed in the respective molds, I prefer to employ a suitable core for reception within each mold during a portion of its travel immediately after being supplied with the charge of coating material, and said cores are constructed and operate in the following manner :—

An endless conveyer 105 of any suitable material extends longitudinally of the shell chilling chamber 106, which is the lowermost chamber in wing C, and the same operates at its opposite ends around sprockets 107, one positioned adjacent the scraper 104 immediately below the edge of the cover 62 for the chamber 35, Figure 1 of the drawings, and the other in a plane slightly below said first mentioned sprocket at a point adjacent the sprocket 3, Figure 5 of the drawings, the major portion of the upper and lower flights of the conveyer 105 are disposed parallel with the lower flight 8 of the main conveyer, but that portion of the upper and lower flights adjacent the sprocket 107, Figure 5 of the drawings, is inclined for the hereinafter described purpose. The conveyer is provided with parallel spaced rows of outwardly extended retaining collars 108 arranged to correspond to the arrangement of rows of molds or cups on the main conveyer, and said shells are preferably threaded into the conveyer 105, as in Figures 7 and 13 of the drawings. The retaining shells are each provided with a shouldered opening 109 through which projects the multiple part outwardly tapered forming core members 110 substantially semi-circular in transverse cross section, and said core members are shouldered to be held within the shell 108 by the shoulders of the opening 109. The core members 110 are received at their base in an enlarged opening 111 in the shell 108, the open end of said opening through which the core members 110 are inserted into said shell 108 is closed by a disc 112 having an opening 113 centrally therethrough. The inner walled surface of the core forming members 110 are beveled preferably to correspond with the angle of the outer surface, but are disposed in parallel relation in a horizontal plane, thus permitting the movement of said core forming sections to and from each other, as in Figures 7 and 13 of the drawings.

The core forming members 110 at their respective bases 114 are provided on their inner surfaces with suitable lugs 115 with which are adapted to co-act the under surface of a disc 116 carried by a core operating plunger 117, the stem of which passes through the opening 113 in the plate 112. The end of the plunger 117 co-acting with the members 110 at a point above the disc 116 is tapered or wedge shaped as at 118 to cooperate with the inner tapered walls of members 110 to normally support the same when the plunger is in operative position, as in Figure 7 of the drawings. A spring 119 coiled about the stem of the plunger 117 normally forces the same into what may be termed operative position, and on the withdrawing of the plunger from operative position, as hereinafter described, the under side of the disc 116 contacting with the upper surfaces of the lugs 115 causes an inward movement of the core forming members toward each other, as in Figure 13, reducing the circumferential area of said core at a time when the core is to be withdrawn from the mold. To assist in the collapsing of the core members 110, I provide suitable coiled springs 120 in recesses in the shell 108 and to press against the core forming members at a point slightly above the lugs 115.

The conveyer 105 carrying the forming cores is not provided with an independent source of power for operating the same, but it will be observed that by disposing the upper flight of the conveyer 105 immediately below the lower flight 8 of the main conveyer with one of the supporting and drive rollers 105′ driven by the sprocket 3, and in timed relation with said main conveyer with the core forming members disposed outwardly, that said respective rows of core forming members are automatically received in the corresponding rows of molds when the main conveyer is operated in the direction of the arrow Figure 5 of the drawings, and thus after the shell has been blown in the respective molds the same is further molded by the action of the cores. On the traveling of the core members to a point adjacent the downward inclination of the belt 105, the respective stems 117 pass through suitable slots 121 in a core release plate 122 extending transversely of the apparatus supporting frame and the plate toward its discharge end is downwardly inclined, as at 123, to lie parallel with the inclined portion of the conveyer 105, thus it will be apparent that the heads 124 on the respective stems 117 which lie beneath the plate 122 and project on each side of the respective slots 121, will, as they contact with the under surface of the plate cause a collapsing of the core members 110, this operation being particularly illustrated in Figures 5, 6, 7 and 13 of the drawings. During this collapsing of the core members 110, it will be observed that the cores are gradually removed from their associated mold prior to the respective rows of molds passing around the sprocket wheel 3, Figure 5 of the drawings. As the molds pass around the sprocket wheel 3, it will be observed that they are turned with the open ends disposed upwardly throughout the entire travel of the upper flight of the conveyer.

As the successive rows of molds or cups 16 are turned with their open ends disposed upwardly, said rows are moved by the step motion of the conveyer to a point immediately below a suitable reservoir 122 for containing fonda or filler to be supplied to the upturned shells within the respective molds and forming the filler for the confection. The reservoir 122 is divided vertically into a plurality of open topped chambers or compartments 123 each adapted for containing a quantity of suitable filler material such as cream or the like, and if desirable the fonda or filler material in all of the chambers may be the same or it may be different as to color, flavor, construction or the like. It will be observed that the material in each of the chambers will supply the shells of their corresponding line of molds of the rows of molds with a similar filler until the supply within the chamber is exhausted or renewed. Owing to the consistency and heavy body of the filling material within the chambers or compartments, it is desirable to provide means for removing from the respective compartments a predetermined charge of material and to inject this charge of material into the open ends of the confection forming shells, and to accomplish this purpose I prefer to use the following mechanism:—

The elongated lower end of the reservoir 122 disposed transversely in close proximity to, and above the upper conveyer flight 7 and is provided with a plurality of apertures 124, one associated with the base of each compartment 123, and one in line with each line of molds of the respective rows of molds carried by the endless conveyer. Beneath said openings 124 is provided a suitable valve mechanism consisting of a valve body 125 formed in its upper surface with material inlet openings 126, one cooperating with each aperture 124, and which openings each connect with an independent cylinder 127 all of which open at one side of the valve body 125, Figure 15 of the drawings. From each cylinder 127 extends a downwardly disposed material discharge opening 128 disposed in alignment with the apertures 124 of the respective chambers 123, as in Figure 15 of the drawings. Suitable sliding valve plates 129 and 130 are positioned within the valve body 125 intersecting the openings 126 and 128, each of said plates being provided with a port 131 for registering with their respective passages 126 and 128, as in Figure 15 of the drawings.

Mounted in each of the cylinders 127 is a piston 132, each carrying a stem 133, and each stem is in turn pivotally connected to the end of a supporting lever 134 mounted on an adjustable fulcrum 135, the inner end of which is adapted for receiving within one of a plurality of threaded openings 136 disposed vertically in a supporting plate on one face of the reservoir 122. The upper end of each lever 134 pivotally connects with a cam surface 138 on a rotatable shaft 139, mounted in bearings 140 at opposite ends of the reservoir 122, and extending transversely of one face thereof. The rotation of the shaft 139 in the direction of the arrow Figure 15 of the drawings, operates said levers 134 on their fulcrum 135 reciprocating the respective pistons within their associated cylinders. The longitudinal adjustment of the fulcrum member 135 on the lever 134 controls or varies the stroke or movement of the lever 134 which regulates the movement of the piston 132 controlling the charge or volume of material delivered thereby into the respective shells. It will be apparent that by providing an independent adjustment of the fulcrum 135, the volume of material controlled by each piston may be independently varied. To rotate the shaft 139 in the direction of the arrow, Figure 15 of the drawings, I connect said shaft through gear connection 141, Figure 1 of the drawings with the shaft 142, which is driven through a bevel gear 143 from a short shaft 144, it in turn being driven by the shaft 81, as in Figure 2 of the drawings. In order to provide a communication between the respective chambers 123 and their associated cylinders during the outward movement of the pistons within the respective cylinders, and to cut off the discharge communication from the cylinders at this time, I provide a means for operating the slide valves to alternately position their respective ports in register with the passages which they control, and which means consists of arms 145, the ends of which are pivotally connected through slotted guides 146 with the ends of the respective slide valves 129 and 130. The arm member 145 is fulcrumed to oscillate in a bearing 146$^4$, and carries on one end the laterally extending arm 147 which is forked at its end as at 148. Between the forks on the end of the arm 147 extends one end of a lever 149 adapted to swing midway of its length on an adjustable fulcrum 150, the upper or free end of said arm being disposed between suitably spaced discs 151 mounted on the shaft 139, said discs carrying on their inner adjacent faces at diametrically opposed points about the shaft 139, cam surfaces 152, which, on the operation of the shaft 139, swing the lever 146 on its fulcrum 150. The valve operating mechanism is so arranged as to provide a communication between the cylinders and the interior of the respective chambers 123, during the outward movement of the pistons, and when the discharge communication from the respective cylinders is closed, and to close said communication between the chambers and the cylinders during such time as the discharge communication is open and the pistons are moving inwardly in their respective chambers. Thus the material is drawn from the respective chambers into the cylinders, and is afterwards forcibly expelled therefrom into the molds insuring uniform predetermined discharges of filling material to be supplied to each of the formed shells within the molds as the same are moved into register with the openings 128.

After each of the shells of any given row of molds are supplied with filling material from the reservoir 122, movement of the conveyer supporting the molds carries the same longitudinally through the chilling chamber 152' into and through the upper chilling chamber 153 of the wing C, thus chilling the confection and the filler contained therein.

It will be observed that the filled confections are up to this point not supplied with a coating for closing the open end of the mold which completes the outer shell, and in the present embodiment of the invention forms the bottom of the confection, but as the molds are successively moved with the upper flight of the conveyer toward the reduced portion E of the central section A of the apparatus, the same are supplied with a closure coating of the same material which forms the shell, this mechanism being particularly illustrated in Figures 2 and 3.

Immediately prior to receiving this shell closure coating material, the exposed peripheral edges of the shell opening are passed immediately beneath a suitable heating element 152$^3$, which is disposed transversely above the upper conveyer flight 7 between the inner end of the chamber 153 and the reduced end E of the main portion A of the apparatus, said heating element preferably being in the form of a suitable coil supplied with electricity through the leads 152$^4$, and the action of this heat on the edges of the chilled shells within the molds melts the same sufficiently to permit the closure filling hereinafter supplied, to readily adhere thereto and form a part thereof when the same becomes cooled as hereinafter described.

Figure 19:
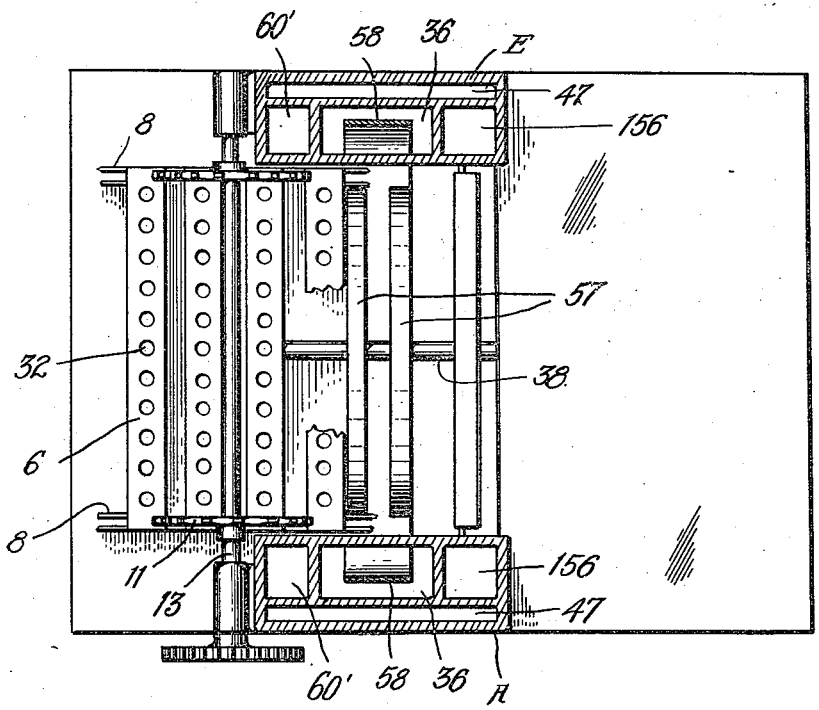
Figure 19 is a section taken on line 19—19 Figure 3.

The shell forming material removed from the belt or elevator 53 by the scraper 58, and dropping on the directing wall 59′ passes therefrom into a sump 154 within the upper end of the centrally reduced portion E of the main portion A of the apparatus, and on said sump being filled to its capacity the material flows therefrom over the end walls 155, Figure 3, returning to the container 35 by gravity through the return channels 156, Figure 3 and 19 of the drawings. The temperature of the material within the sump 154 may be readily ascertained by a thermometer 157 communicating with the interior of the sump, and carried on the face of the apparatus, as in Figure 2 of the drawings. Like the fonda reservoir 122, the sump 154 is closed at its lower end by a valve body 158 extending transversely over the upper conveyer flight 7, and the same is provided with a plurality of vertical channels 159 extending therethrough, one in alignment with each mold of the respective rows of molds, and through said channels is supplied from the sump 154 a quantity of coating material in a plastic state, and of an amount sufficient, when filled confections are being molded, to provide a closure for the open end of the filled shell within the respective molds. The feeding of the shell closure forming material is controlled preferably in the following manner:—The body 158 is provided with a plurality of cylinders 160, one communicating with each channel 159 intermediate of its ends, and in each of said cylinders is mounted to reciprocate a piston 161, the stems thereof being connected to an operating frame 162 pivotally supported on its ends on the shaft 12, and one end thereof forming the upper extension of a swinging lever 163 slotted at its lower end as at 164, and within which slot extends an operating pin 165, on the outer end of the arm 89. While the valve gear of the closure supplying material sump is of a construction different from that associated with the fonda container 122, it will be understood that the fonda container and its valve gear may be used in place of the sump 154 with but little alteration to the apparatus. The adjustment of the pin 165 of arm 89 longitudinally of its slot 164 will vary the stroke of the pistons within their cylinders to vary the amount of material supplied to the cups for closing the same. This adjustment also enables the fonda or filler to be eliminated and the molds to be entirely filled with and closed by the same material that forms the shell. It will be apparent that on the reciprocation of the arm 89 by the rotation of the shaft 84 oscillating movement is imparted through the lever 163 to the frame 162, reciprocating the pistons 161 in their respective cylinders. Suitably operated slide valves 166 and 167 are positioned to control the opposite ends of the channels 159, the port in the valves being arranged in such a manner that on the reciprocation of the valves, opposite ends of the channels 159 will be alternately opened and closed, the inlet ends being opened on the outward movement of the pistons, at which time the discharge ends are closed, and the discharge ends being opened on the inward movement of the pistons, at which time the inlet ends are closed. The plate valves 166 and 167 are disposed with their ports in staggered relation longitudinally of the respective valves, the ports assuming a normal position relative to each other as is illustrated between the valves 129 and 130 in Figures 14 and 15 of the drawings, but unlike the valves of the fonda container, valves 166 and 167 are operated simultaneously in the same direction, they being pivotally connected at their respective outer ends as at 169 with a lever 170 which is pivotally mounted at one end as at 171 to the outer surface of the reduced portion E of the central section A of the main portion of the apparatus. The mechanism for operating the lever 170 is similar to that illustrated in Figures 14 and 16 for operating the lever 149 and consists of a rotary stub shaft 172 disposed at right angles to the shaft 84, and having gear connections through the bevel gears 173 with the shaft 84. The stub shaft carries a pair of spaced cam discs 174 and 175 disposed one on each side of the free end of the lever 170 and carrying on adjacent faces lever operating cams 176, the discs being capable of independent adjustment about the stub shaft 172. While the charge of closing material discharged into each mold from the sump 154 is of a sufficient quantity, when what is termed "filled goods" is being manufactured, to close the open end of the filled shell, it will be apparent that the forming of the shell and filling of the same with fonda from the reservoir 122 may be eliminated, and the adjustment of the arm 89 in the slot 164 may be varied from that illustrated in Figure 2, enabling a charge to be fed to each mold of a sufficient quantity to entirely fill the same, and form them what is termed "solid goods". By this present arrangement also, it will be apparent that where chocolate shells, or shell forming material are preferred in the molds, the same may be readily filled and closed with the same material of which the shells are formed.

After the closure has been provided for the shell, as above described, or a piece of solid goods has been formed in the molds, the travel of the upper flight of the conveyer 7 by its motion conveys the closed and filled or formed confection through the reduced portion E of the central section A of the apparatus with the closed end of the shell, or the bottom of the formed confection, upwardly disposed, and conveys the same into and through the upper confection chilling chamber 177 in the wing B of the apparatus, Figure 1 of the drawings, and into and through the chilling chamber 177′ also in wing B of the apparatus. The passage of the confection through these chambers chills the closure forming material so that the same will solidify, and the formed confections are now ready to be discharged from the molds and removed from the apparatus, and to accomplish this purpose I prefer to employ the following mechanism:—
An endless distributing belt 178 on to which the finished confections are discharged from the molds in a hereinafter described manner, extends longitudinally of the wing B of the apparatus with its lower flight 179 disposed immediately above and in parallel relation with the portion of the upper flight 7 of the main conveyer within the wing B and passes around the sprockets 2 in close proximity therewith, and as in Figure 8 of the drawings. The portion of the belt at the inner end of the wing B passes around a roller 180 and at the far end of the wing B, operates over suitable idler and supporting rollers 181. A portion of said endless conveyer 178 extends downwardly at an incline, as in Figure 1, and around a stationary support 182 which lies adjacent to one end of a distributing table of a type described in my co-pending application Serial Number 381,849 filed May 17, 1920. The outer surface of the conveyer 178 carries a plurality of overlapping sheets of material 183 preferably of oiled material, such as paper, which are secured in any suitable manner to the belt at their forward ends, as in Figure 8 of the drawings, and these sheets are adapted, as they successively pass around the roller 180 to contact with closed end of the respective confections as carried by their associated molds, and the sheets are forced into contact with the closed end of the confections by suitable pressure roller 184 disposed transversely above the lower flight 179 of said distributing conveyer. It will be apparent that by providing the conveyer 178 with its lower horizontal flight disposed as at 179, Figure 1 of the drawings, the open ends of the molds containing the finished confections are provided with a closure which moves with the upper flight 7 of the main conveyer, and at such time and in a manner hereinafter described, as the molds pass around the sprocket 2, the molds will be turned with their open ends downwardly which permits of the confections adhering to the sheets 183 to discharge therefrom and be supported on said sheets 183.

As molds with the confections contained therein approach the sprocket 2, the mold actuating bars 27 contact at their ends with the mold release bar 185 disposed longitudinally of one side of the upper flight 7 of the main conveyer causing an inward movement of the members 27, which, through their associated parts actuate the mold sections 17 and 18 to cause a separation thereof, permitting the release of the confection from the walls of their respective molds, and said mold sections are held separated until the same pass around the sprocket 2 and return on the lower flight 8 of the main conveyer. To further insure the release of the formed confection from within the molds, heads 32 of the stem 31 are moved through slots 186 in suitable downwardly inclined plates 187 disposed between the upper and lower flights 7 and 8 of the main conveyer, and which plates are arranged in parallel spaced relation transversely of the conveyer, thus the plates 29 are removed from their associated ends of their respective molds a number of times, and after each time of being removed are permitted by the action of the springs 34 to strike against the end walls of the molds with which they normally contact. The operation of the plates 29 as described, and the separation of the mold sections 17 and 18, insures the release of the molded confection from within their respective molds, and as the respective rows of molds pass around the sprocket 2, the formed confections therein adhering to the sheets 183 are now deposited on to the sheets 183 which have moved therewith through frictional contact.

From the sheets 183, the molded confections are deposited on to a suitable assorting and packing table constructed in any suitable manner.

The chilling chambers within the wings B and C are preferably maintained at a temperature of between 30 and 60 degrees Fahrenheit to insure the best results in the making of the confection, and such temperature is maintained preferably through a series of pipes 251 communicating with the respective chambers and connected through a controlling valve 252 with a supply pipe 253 extending from a suitable refrigerating chamber 254.

By my present method it will be readily apparent that the confections of any design ornamentation, shape, size and flavor are formed or molded in permanent molds, thus dispensing with the present form of starch molds.

It will be further apparent that a number of different flavored confections may be simultaneously molded, and each different flavor may be distributed to an independent packer, also that confections may be formed wherein the filler is of the same material as the shell or coating.

I claim:—

1. The method of making confections which consists in depositing a charge of confection forming material in a plastic condition into a mold through an opening therein, then forming a shell thereof having an open end, by forcibly distributing the plastic material over the inner wall of the mold by injecting an air blast into the mold through its opening, then supplying the formed shell through the opening therein with a charge of filling material, then closing the opening in the shell forming material and causing the same to unite with the edges of the shell opening, and then discharging the formed confection from the mold through the opening through which the material was supplied thereto.

2. The method of making confections which consists in supplying to a mold a charge of confection forming material in a plastic condition, then forming a shell thereof within the mold by injecting an air blast into the mold for distributing the plastic material over the inner wall surface of the mold, then compressing the shell walls formed by the distributed plastic material and then closing the opening in the formed shell after a filler has been supplied to the shell therethrough.

3. The method of molding confections from material in a plastic condition which consists in depositing heated confection forming material in a plastic condition into an opening in one end of a mold and distributing the same over the interior thereof in a thin layer by pressing the same against its supporting wall surfaces to provide a cupped shell open at the open end of said mold, then subjecting the mold with its associated shell to the action of a cooling medium to cause the shell to set on the mold surface, and then releasing the shell from the mold and discharging the shell from the mold through its end opening.

4. The method of making confections which consists in forming in a continuously traveling mold having an open end a confection of a form and configuration to correspond with the mold, then inverting said mold and when the same is in said position moving into contact with a portion of the confection exposed through said mold opening a continuously moving supporting surface, and then restoring said mold to a position with its open end downwardly disposed and releasing the formed confection from the mold and depositing the same onto said surface to be supported thereby for conveying from the mold.

5. The method of molding confections from confection forming material in a plastic condition to obtain a confection of a predetermined size and shape which consists in positioning the open end of an expansible mold downwardly disposed with the opening in register with a supply of confection forming material in a plastic condition, delivering to the mold through the open end thereof a charge of said material less than the capacity of the mold, then removing the mold from in register with the supply of material and injecting an air blast thereinto for distributing the charge over the inner surface of the mold to form a cupped shell therein of the configuration of the finished confection, then inverting the mold with its contained shell and supplying to said shell a filling, then covering the exposed portion of the filling with shell forming material united to the shell, and lastly returning the mold to its first position and discharging the formed confection from the mold through its open end.

In testimony whereof I have signed my name to this specification.

CLIFFORD P. SPECK.